April 4, 1939.	G. A. SMITH	2,152,671

WELL SURVEYING INSTRUMENT

Filed Oct. 26, 1935    2 Sheets-Sheet 1

WITNESS:

INVENTOR

George A. Smith
BY
ATTORNEYS.

April 4, 1939.  G. A. SMITH  2,152,671
WELL SURVEYING INSTRUMENT
Filed Oct. 26, 1935  2 Sheets-Sheet 2
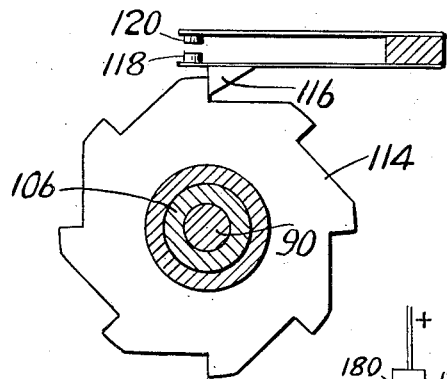
FIG.3.
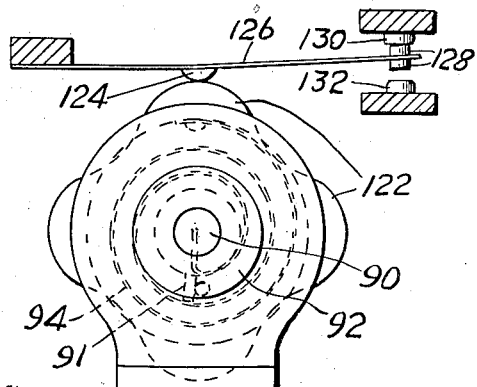
FIG.4.
FIG.9.
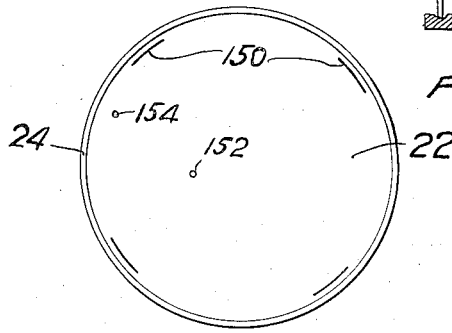
FIG.5.
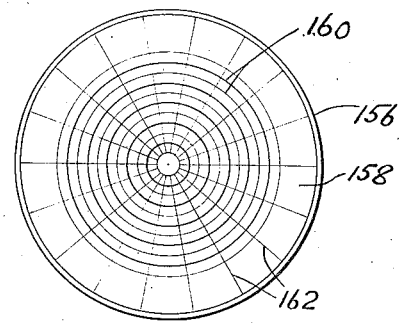
FIG.6.
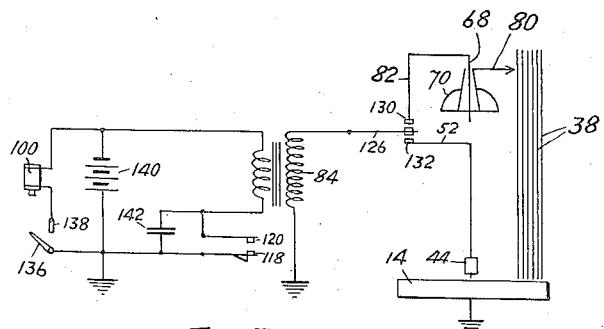
FIG.7.
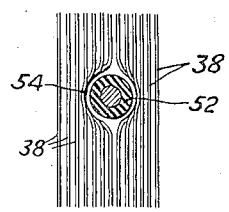
FIG.8.
WITNESS:
Rob R Ketchel
INVENTOR
George A. Smith
BY
Busser & Harding
ATTORNEYS Patented Apr. 4, 1939

2,152,671

UNITED STATES PATENT OFFICE 2,152,671

WELL SURVEYING INSTRUMENT

George A. Smith, Philadelphia, Pa., assignor to Sperry-Sun Well Surveying Company, Philadelphia, Pa., a corporation of Delaware Application October 26, 1935, Serial No. 46,865

13 Claims. (Cl. 33—205.5)

This invention relates to a well surveying instrument of the type adapted to be lowered into a bore hole and give an indication of the inclination or both the inclination and azimuth of maximum inclination of the hole at a predetermined point or points.

In drilling oil wells or the like it may happen, due to variations in the strata through which the drill passes, or to other causes, that the bore hole will deviate to a considerable extent from the vertical. As a result of this deviation, the bore hole may miss entirely the formations which it was intended that it should penetrate and various conclusions based on assumptions that the hole is vertical may be seriously in error. To determine accurately the paths of bore holes, there have been devised various surveying instruments giving either complete or useful partial information concerning the paths of crooked holes. Through the use of these instruments, various causes of crooked holes have been determined and at present, by the exercise of proper care in drilling, deviations of holes from the vertical may generally be controlled so that the total deviations may become relatively slight. Deviations from the vertical, however, are cumulative and consequently it is desirable to continuously check the progress of the drill so that if even a slight deviation from the vertical occurs proper precautions may be taken to immediately straighten the hole. An instrument designed for the purpose of checking should be inexpensive in construction and readily used in a fashion impeding as little as possible the progress of the drilling, while nevertheless being capable of giving results having a high degree of accuracy in order that positive indication may be had of deviations from the vertical amounting to fractions of a degree.

The above discussion assumes that it is generally desirable that a bore hole should be vertical. This is quite true, but in isolated instances holes are intentionally deviated from the vertical for various purposes by the use of whipstocks. In such cases it becomes important to accurately trace the path of the bore hole in order to determine whether the desired result is being achieved, and accordingly a well surveying device must be capable of indicating accurately the path of the bore hole over large ranges of slopes.

It is the broad object of the present invention to provide a well surveying device of simple construction and of readily operated type, particularly designed for the checking of the progress of drilling by accurately recording small deviations from verticality but nevertheless also adapted to accurately indicate large deviations as well as small ones. Where mere checking of the progress of drilling is desired, it is usually unnecessary to determine the azimuth in which the maximum inclination occurs. The invention may accordingly be embodied for many purposes in a simple form in which inclination alone is indicated. The invention, however, contemplates also the indication of the azimuth of the inclination and is described herein in a form suitable for that purpose. Permanent records are made showing the degree of inclination or both the degree of inclination and the azimuth.

In its more useful form, the invention is directed to a type of instrument known as a single shot instrument, in which a record is made at only one point in a bore hole and the instrument then withdrawn for examination. It will be clear, however, that the invention is also adapted to the multiple shot type of instrument in which records are made in a single run at various points in a bore hole so that from such run the path of the hole may be completely determined.

The various subsidiary objects of the invention related to the general objects above outlined will be apparent from the following description read in conjunction with the accompanying drawings, in which:

Fig. 3 is a vertical section taken on the plane indicated at 3—3 in Fig. 2;

Fig. 4 is a view partly in elevation and partly in section showing elements at the right hand side of Fig. 2;

Fig. 5 is a plan view showing a record member having records thereon formed in the instrument;

Fig. 6 is a plan view showing a scale member which may be applied to the record for purposes of ready interpretation;

Fig. 7 is a wiring diagram showing electrical connections in the instrument;

Fig. 8 is a fragmentary sectional view illustrating the fashion in which a conducting cable may be brought through a cage of conducting wires insulated therefrom; and Fig. 9 is a diagrammatic sectional view showing a modified instrument in accordance with the invention.

The instrument comprises an inner casing 2 supporting the operating parts, which casing may be made in sectional fashion so as to permit ready access to the various elements, this casing being also provided with suitable openings through which adjustments may be made. The casing 2 is arranged to be enclosed in a suitable water-tight protective casing 3 capable of withstanding the pressures encountered in a bore hole at the maximum depths thereof. This casing may be lowered upon a wire line or upon a drill stem in conventional fashion and, in fact, may be carried by a drill stem which at its lower end carries a working drill. Readings in such case may be made after long intervals when the drill is stopped for a short period. In case the instrument includes a magnetic compass as herein indicated, both the inner and outer casings must be of non-magnetic material. On the other hand, if the instrument contains the inclination unit alone or contains such unit in conjunction with a gyroscopic compass, the casings may be of iron or steel.

Figure 1:
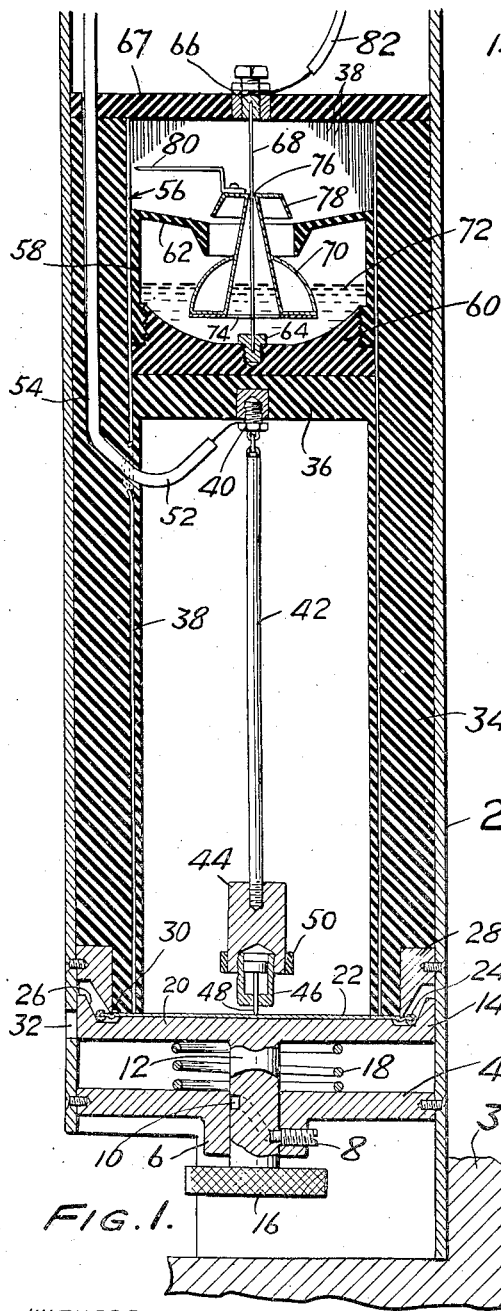
Fig. 1 is a fragmentary longitudinal sectional view showing the lower portion of a single shot instrument constructed in accordance with the invention.

Referring first to Fig. 1, there is located in the bottom of the casing 2 a transverse plate 4 providing a bearing 6 for a stem 12 which is provided with a screw groove 10 in which there projects a pin 8 carried by the bearing 6. By reason of this arrangement, turning of a knob 16 attached to the stem 12 results in upward and downward movement of a backing plate 14, the normal position of which is raised, this position being maintained by the use of a spring 18. The backing plate 14 is provided with a central raised portion 20 designed to engage the central portion of a disc 22, preferably of paper though possibly of other nature as indicated hereafter, which constitutes the record member and which is reinforced at its edges by a metallic ring indicated at 24. The disc is centered by the resting of the ring 24 within the conical cup indicated at 26. When the backing plate 14 is in its upper position, it presses the disc against the lower edge of a cylinder 34, which is preferably of Bakelite though it may be of other insulating material such as rubber or the like, and against the projecting edges or points 30 of an annular metallic ring 28 which forms a support for the Bakelite cylinder. The points, or edges, at 30 are provided to produce indentations in the edges of the disc inside the metallic ring 24 so as to outline a circle which will give a suitable indication of the position of the disc relative to the axis of the instrument if centralization is not accurately effected by the conical socket. The backing plate 14 may be drawn below an opening 32 in the side of the inner housing 2 so that the disc may be located in position and withdrawn. The plate 14 is metallic and grounded to the casing 2.

The Bakelite cylinder 34 may be molded to suitable shape, with a transverse partition indicated at 36 separating it into upper and lower chambers. Within the cylinder and near its inner cylindrical surface are located equally spaced axial conducting wires 38 forming a cage entirely around the cylinder, the wires being spaced only very slightly from each other so that their angular spacing is one degree, or more or less, depending upon the accuracy of azimuthal indication which the instrument is designed to give. Below the partition 36 these wires are embedded beneath the inner surface of the cylinder so as to be insulated from the lower chamber. Their lower ends are exposed in the plane of the bottom of the insulating cylinder 34 so as to engage or closely approach the record disk 22.

This may be effected by grinding the bottom of the cylinder and the wire ends to a plane. In the case of the upper chamber, however, the wires are preferably similarly molded but the Bakelite on the inner surface is removed by turning until the metal of the wires is exposed, as indicated at 56, giving rise to a cage of interiorly exposed conductors. Reference will be made hereafter to the purpose of this arrangement.

The horizontal partition 36 carries at 40 a universally mounted pendulum 42, for example, through the medium of a plurality of chain links. The pendulum 42 comprises a spindle of suitable length carrying on its lower end a heavy bob 44 into which is threaded a thimble 46 provided with a cylindrical bore and a central opening to furnish a mounting for a headed pin indicated at 48. This pin is preferably very light and is provided with a rounded point at its lower end arranged to contact with the disc 22 with a minimum of friction. The radius of curvature of this point should be as small as possible consistent with the avoidance of penetration of the point into the disc which might result in detrimental hindrance to the free swinging of the pendulum. By the use of a heavy bob, the damping effect of a light pin of proper construction may be made comparatively so small that the pendulum will assume at all times a vertical position within negligible deviation limits. On the other hand, slight damping is desirable so that the pendulum will not swing for an undesirably long time but will quickly come to rest. In view of the rough handling to which an instrument of this sort is subjected, it is desirable to surround the bob 44 with a cushioning ring of rubber, indicated at 50, to prevent cracking of the Bakelite or other insulating material if the pendulum swings against the cylinder walls.

Electrical connection is made to the pendulum support 40 by means of an insulated wire 52 passing downwardly through a hole 54 in the cylinder. The insulated wire 52 must pass through the cage of wires 38 and for this purpose the wires may be locally displaced, as indicated in Fig. 8. These wires should be insulated from each other and it is desirable, therefore, to enamel the wires prior to molding in the Bakelite so that where they are crowded together due to the passage of the wire 52 they may be effectively insulated from each other even though the Bakelite may not enter between them. As will be obvious hereafter, although high potentials are used in the apparatus, the difference of potential between adjacent wires is relatively slight, so that very little insulation will suffice to prevent improper operation.

The upper portion of the cylinder 34 carries a magnetic compass. In order that the compass may be mounted so as to be damped in liquid, it is preferable to mount it in a separate cup also made of insulating material such as Bakelite or rubber and consisting of two parts 58 and 60 which may be threaded together with a suitable gasket between them to provide a liquid retaining cup which may be taken apart for cleaning or the assembly of the unit. This cup is provided with lips 62 arranged to prevent the spilling of the liquid, the arrangement being preferably such that the instrument may be turned upside down without danger of spilling the damping liquid 72 into the upper portion of the cylinder above the cup. A minimum amount of liquid in the cup is desirable and to aid in attaining this end the bottom of the cup may be dished as indicated. A centrally bored screw 64 in the portion 60 of the cup forms a socket for the reception of a vertical rod 68 which is held at its upper end in a socket 66 carried by a cover plate 67 of insulation, closing off the upper portion of the cylinder. The rod 68 serves to centralize a floating compass 70 which carries a magnetized compass element indicated at 74. A bore 76 fitting closely about the rod 78 and provided with properly rounded edges serves as the fulcrum point for the tilting of the compass, which floats partly submerged in the liquid 72. Skirts 78 are preferably provided to insure that splashing liquid will return to the cup without wetting the exposed wires 38. The compass is preferably of non-magnetic sheet metal except for the needle portion 74, and carries a radially extending wire point indicated at 80, the upper end of which moves closely adjacent to, but without touching the exposed upper ends of, the wires 38. Electrical connection to this point is effected from an insulated wire 82 through the rod 68, across any gap or contact at the opening 76, and through the portion 78 of the compass.

Any suitable damping liquid may be used, preferably a non-inflammable, non-conducting liquid such as, for example, a halogenated hydrocarbon. Non-conducting characteristics are by no means essential, but are desirable to prevent any possible short circuiting of the exposed conductors 38 to each other.

Figure 2:
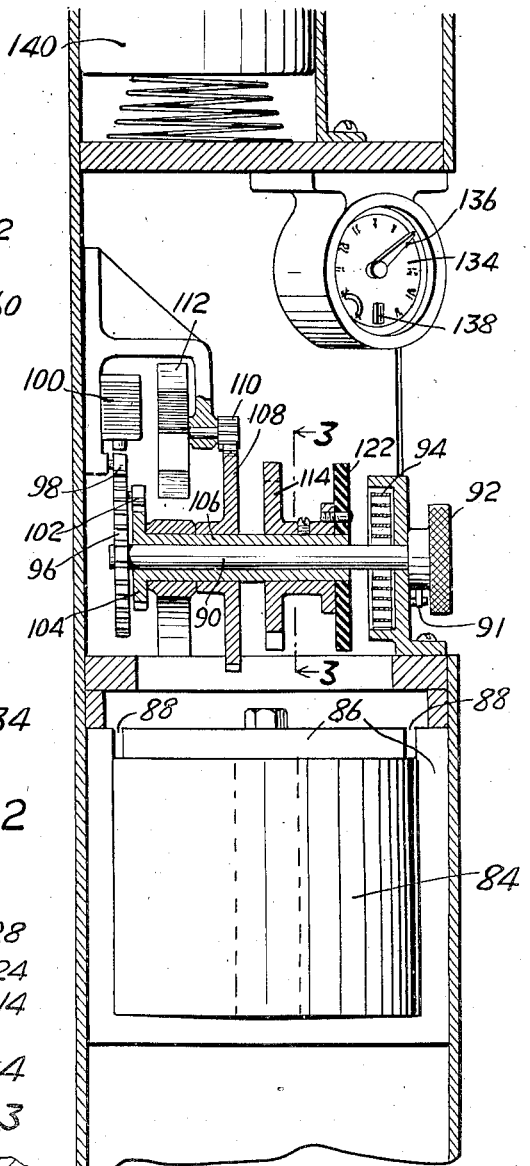
Fig. 2 is a similar view showing the upper portion of the same instrument.

Referring now to Fig. 2, the upper end of the inner casing contains a high tension spark coil indicated at 84 and provided with a core arrangement 86 having gaps 88 to insure a rapid diminution of flux following the breaking of the primary circuit and hence a high secondary voltage sufficient to produce a spark of substantial length. The semi-closed core arrangement is preferably used in order that the magnetic field of the transformer will not affect the magnetic compass 74. Additionally for this reason, the transformer, as well as all other elements carrying heavy currents, is located at a substantial distance from the compass.

In every operation of the device the transformer 84 must be energized to produce a plurality of sparks. Primary control mechanism and distributing means is located above the transformer and comprises a shaft 90 provided with a winding knob 92 and normally urged in a counterclockwise direction as viewed in Fig. 3 by means of a spring 94. The shaft 90 at its left-hand end carries a ratchet 96 which is normally restrained against counterclockwise movement when the spring is wound up by a pawl 98 engaging teeth in its periphery and adapted to be raised to free the ratchet at predetermined times by an electromagnet 100. The ratchet 96 carries a spring controlled pawl 102 which is arranged to engage the teeth of a ratchet 104 and propel the ratchet 104 in a counterclockwise direction whenever the ratchet 96 is freed to so move. On the other hand, the pawl 102 permits the ratchet 96 to be rotated clockwise by manipulation of knob 92 to wind up spring 94 without correspondingly rotating the ratchet 104. The ratchet 104 is formed as part of a sleeve 106 within which the shaft 90 is journalled and which itself is journalled in a suitable bearing. The sleeve 106 has secured thereto a gear 108 which meshes with a small pinion 110 mounted in a suitable framework, the shaft of which pinion carries a fan 112. This arrangement is provided to slow down the rotation of the sleeve 106 under the action of spring 94 so as to properly effect the breaking of the primary circuit of the transformer and the commutation of the secondary output. The sleeve 106 additionally carries a toothed member 114 with which cooperates a cam follower 116 carried by the member 118 of a primary breaker, which member 118 is arranged to engage and disengage a contact 120 as the member 114 rotates. The teeth are so arranged as to produce a quick break to thereby insure a maximum induced voltage in the transformer secondary.

The sleeve 106 also carries a cam 122 of insulation such as hard rubber, Bakelite, or fibre, which is provided with half as many lobes as there are teeth on member 114, which lobes cooperate with a follower 124 carried by a spring 126 provided with contacts 128 which, as the cam 122 operates, alternately engage stationary contacts 130 and 132, which are connected respectively to the wires 82 and 52.

A clockwork controlled switch is indicated at 134 and is so arranged that an arm 136 driven by a clockwork mechanism may engage a contact 138 and close the circuit through electromagnet 100 after any suitable predetermined interval. This clock is preferably calibrated so as to read in elapsed time so that if the arm 136, for example, is set at a point marked, say "15", then fifteen minutes will elapse before contact is made and the electromagnet 100 energized.

Current for the operation of the device is provided by a set of small cells such as flash light cells indicated at 140 and arranged in the upper portion of the casing with suitable positive and negative contacts. The entire wiring arrangement of the apparatus is illustrated in Fig. 7, from which it will be seen that the battery 140 is arranged to provide both the current for energization of electromagnet 100 and of the primary of the transformer 84, the latter of which is in series with the contacts 118 and 120 which are shunted by a condenser 142 functioning in the usual fashion in connection with the spark coil, not only to reduce sparking but to secure a maximum voltage in the secondary. The commutator 126 connects the secondary at times voltage is induced therein alternately with the compass 70 and the pendulum 44. One end of the secondary is grounded to the casing and the backing plate 14 is also grounded thereto. It will be seen, therefore, that the alternate secondary circuits are from the ungrounded end of the secondary through commutator 126, contact 132, wire 52, pendulum 44, and plate 14 to ground and through commutator 126, contact 130, wire 82, compass 70, pointer 80, one of wires 38, and plate 14 to ground.

In order to operate the instrument, a disc 22 is passed through opening 32 upon the lowered backing plate 14 which is then caused to move upwardly by manipulation of knob 16 so that the disc is pressed against the lower exposed ends of the wires 38 and against the lower end of the pin 48. At the same time pressure against the points 30 of the member 28 marks the disc as at 150 so as to give an indication of its relationship relative to the axis of the instrument.

The time switch 134 is then wound up and set so that a delayed contact is provided which will insure sufficient time for lowering the instrument to the place where a record is to be made and a suitable additional time for the parts to come to rest. The knob 92 is then turned to the limit defined by the stops 91 to wind up the spring 94, the shaft 90 being held in its final adjusted position by the pawl 98 cooperating with the ratchet 96. The recording apparatus may then be placed in its protective casing 3 which is lowered into the bore hole in any suitable fashion.

As soon as contact is made by the time switch, the electromagnet 100 is energized and pawl 98 raised. Through the release of ratchet 96 the spring 94 is enabled to impart a single revolution to the sleeve 106 to effect a succession of breaks in the primary transformer circuit and commutation of the secondary output of the transformer to the pendulum and compass.

Each time a connection is made to the pendulum a spark is caused to jump through the disc 22 from the point 48 to the backing plate 14. If the pendulum is at rest in its vertical position, all of these sparks will pass through the same opening and there will appear a small perforation such as 152 through the disc. On the other hand, if the pendulum has been swinging, the sparks in general would not pass through the same hole but a series of holes will be produced which would serve to give warning that the record could not be regarded as reliable and that a new run should be made. The fan slowing down the shaft 90 insures that the successive sparks follow each other at short intervals so that even slow swinging of the pendulum will be made apparent by a series of perforations.

When the secondary is connected to the compass, the sparks will be caused to jump from the point 80 to the wire 38 which is most closely adjacent the point, and the circuit will be completed by corresponding sparks jumping between the lower end of the wire and the plate 14 through the disc 22 producing a perforation such as 154. If the compass was at rest, all of the sparks of the series should jump the same places and consequently only a single hole should be produced in the paper. On the other hand, if the compass were swinging, in general a series of holes would be produced, again notifying the operator that an equilibrium position of the moving parts had not been attained and that the determination would have to be repeated.

The record disc obtained from proper operation would have an appearance such as indicated in Fig. 5, containing two perforations made by pendulum and compass action respectively at 152 and 154 and a series of indentations at 150 made by the points or edges 30. In order to conveniently interpret the results, assuming, for example, that the pointer 8 points in the "North" direction, there may be superimposed upon the record a scale member such as indicated in Fig. 6, comprising, for example, a Celluloid disc 156 provided with markings including an outer circle 158 arranged to be lined up with the indentations 150 so as to properly center the scale, and a series of central circles 160 spaced at intervals corresponding, for example, to inclination intervals of half degrees. By superimposing such scale upon the record, the angle of inclination may be read directly. The azimuth of the inclination may be read by the use of a separate protractor or, if desired, suitable protractor markings 162 may be made upon the scale 156.

It is found that record discs made of an ordinary good grade of paper are quite satisfactory, since even a single spark will produce visible perforation. The perforations, however, are quite fine and though fineness is desirable to secure very accurate indications, such perforations may require marking by a pencil, for example, in order to be sufficiently visible so that direct readings may be conveniently made with a scale. It is possible, however, to impregnate the paper with some material which will be darkened by the heat accompanying the passage of the spark. Such impregnating agents, for example, may be carbohydrates, such as sugar or starch. The passage of the spark will then produce a darkening surrounding the perforation.

In the modification which has been described, separate sparking currents are sent through the compass and pendulum. By this arrangement, which involves a commutation mechanism, it is possible to have the backing member 14 of the record sheet at ground potential. If suitable precautions are taken to insulate the backing member, however, the same sparking current may be sent in series through the pendulum and the compass so that the commutating arrangement may be omitted.

The conducting cage of wires associated with the compass may take other forms than that illustrated. One simple convenient form which it has been found possible to use comprises the use of a woven fabric having running in one direction, for example, the warp, metal covered threads, and in the opposite direction threads of, for example, cotton. Such fabrics are well known and are commonly used for decorative purposes. By mounting such a fabric upon an insulating cylinder, there is produced a cage similar to that already described. Desirably the textile portions of the fabric are impregnated with an insulating material such as wax or shellac to prevent jump of the current between the conductors. There is, however, little tendency for this to occur, since each conductor represents the shortest path for the current unless at the record disc the one which would normally be followed by the current has a higher resistance than an adjacent one to the ground. In such case the current may follow an adjacent conductor which supplies a path of lower total resistance.

Another type of conducting cage which may be used may be formed by interiorly coating an insulating cylinder with a material such as, for example, silver, and then grooving the coated surface along elements of the cylinder to cut slits in the metal, thereby forming a series of lengthwise extending conductors insulated from each other by an air gap, which, if desired, may be filled in with insulation.

It may be noted that it is desirable that the elements between which sparking takes place should be formed of a metal which will not be corroded by the sparking. Various metals or alloys, such, for example, as the noble metals and their alloys, may be used.

The control mechanism, it may be noted, is essentially of an alarm clock type and may be entirely mechanical instead of mechanical-electrical as indicated. By the use of a conventional alarm clock mechanism, a primary interrupting and/or secondary commutating shaft may be driven for a limited period after a predetermined elapsed time.

There has been described herein an arrangement in which current marking is effected through sparking. The marking may, however, be effected otherwise. For example, if the record disc comprises a sheet of paper having a conducting surface produced either by metallic lacquer or by coating with metal foil, then by making variable contact with such surface, for example, through a pin 48 connected to a pendulum and providing a relatively heavy current at either high or low voltage, the heat generated at the contact may produce either local fusing or oxidation of the metal or charring of organic materials associated with the metallic coating if, for example, the coating is produced by the use of a lacquer containing metallic flakes or powder. In the case of the pendulum arrangement a low voltage may be used. In the case of the compass, however, a sufficiently high voltage should be used to produce sparking in order that there would need be no electrical contacts imposing excessive damping upon the movement of the compass. In case a heavy current is carried by the compass, a single impulse alone should occur, since the current might otherwise affect the compass although, for a single impulse, its inertia would prevent any substantial movement from its normal position. In case sparks are produced, the currents are so small that no effect upon a compass is noticeable.

When only indications of inclination are necessary, the compass and its associated conducting cage and the commutation arrangement may be entirely omitted and one or a series of sparks supplied to a compass alone. The apparatus in this simple form is well adapted for checking the progress of drilling and will give indications of inclination to a high degree of accuracy. While the apparatus shown may be used in either go-devil fashion or lowered on a wire line or drill stem, the modification containing the pendulum alone will recommend itself for go-devil checking work.

In Fig. 9 there is illustrated a modified arrangement in accordance with the invention in which the record member comprises two paper or similar sheets 170 which may be marked by a spark between which there is a conducting sheet of metal foil or the like, indicated at 172. The record member thus produced may be of laminated, unitary form, the facings for the conducting intermediate sheet being secured thereto by a suitable adhesive. The laminated record member in the form of a disc may be supported upon a Bakelite ring 174 suitably mounted in the casing and clamped in position by a vertically movable Bakelite ring 176. The record member is thus insulated from the casing. In engagement with the upper sheet 170 there is a rounded pin 178 carried by a pendulum 180, the pendulum arrangement being, for example, identical with that previously described. Below the lower sheet 170 and movable adjacent thereto is a sparking point 182 carried by a spindle 184 which is delicately mounted and carries a compass needle 186, the spindle 184 being grounded through its supporting means. By connecting the high voltage wires, controlled, for example, as in the previous modification, between the casing and the pendulum 180, it will be clear that the path of current will be from 178 as a spark through the upper sheet 170 to the intermediate conducting sheet 172 and then as a spark through the lower sheet 170 to the point 182. Preferably, as described above, a series of sparks are used, but in this case the same current produces both inclination and azimuth marks on opposite sides of the record member. By the use of a suitable scale in the form of, for example, a Celluloid envelope into which the record member may be inserted, the readings on the two sides may be correlated to give an indication of the inclination and direction of slope of the hole.

While the invention has been described particularly in connection with a single shot instrument, it will be obvious that it may be applied to a multi-shot type of instrument by having sparking occur through a strip of paper which is intermittently moved by the same type of mechanism used in multiple shot instruments for advancing photographic film as, for example, in the type of instrument described and illustrated in Williston and Nichols Patent No. 1,960,038, dated May 22, 1934.

What I claim and desire to protect by Letters Patent is:

1. A well surveying device comprising a casing adapted to enter a bore hole, means for supporting therein a record member capable of being marked by an electric current, a compass having a conducting portion movable in said casing relative to the record member, a cage of elongated conducting elements surrounding said conducting portion of the compass and adjacent which said conducting portion moves, said elongated conducting elements terminating adjacent said record member, and means for producing an electric current through the conducting portion of the compass and one of said conducting elements adjacent thereto, to mark said record member to record the position of the compass relative to said member.

2. A well surveying device comprising a casing adapted to enter a bore hole, means for supporting therein a record member capable of being marked by a spark, a compass having a conducting portion movable in said casing relative to the record member, a cage of elongated conducting elements surrounding said conducting portion of the compass and adjacent which said conducting portion moves, said elongated conducting elements terminating adjacent said record member, and means for producing an electric current through the conducting portion of the compass, one of said conducting elements adjacent thereto, and said record member in the form of a spark to mark the position of the compass relative to said member.

3. A well surveying device comprising a casing adapted to enter a bore hole, means for clamping therein a paper disc, means associated with the clamping means for marking the disc to show its position in the casing, an element having variable location relative to said paper disc depending upon inclination of the casing, and means for producing a spark through the disc from the element to mark the position of the element relative to said disc.

4. A well surveying device comprising a casing adapted to enter a bore hole, means for supporting therein in determinable relationship to the casing a record member capable of being marked by an electric current, an element contacting with one side of said record member, and having variable location relative to said casing depending upon inclination of the casing, a conductor substantially engaging the opposite side of said record member throughout an area traversible by said element, and means for producing an electric current through said element, record member and conductor to mark the position of the element relative to said member.

5. A well surveying device comprising a casing adapted to enter a bore hole, means for supporting therein in determinable relationship to the casing a record member capable of being marked by penetration by a spark, an element contacting with one side of said record member, and having variable location relative to said casing depending upon inclination of the casing, a conductor substantially engaging the opposite side of said record member throughout an area traversible by said element, and means for producing a spark through the record member from the element to the conductor to mark the position or the element relative to said member.

6. A well surveying device comprising a casing adapted to enter a bore hole, means for clamping therein a paper disc, means associated with the clamping means for marking the disc to show its position in the casing, an element contacting with, and having variable location relative to said paper disc depending upon inclination of the casing, and means for producing a spark through the disc from the element to mark the position of the element relative to said disc.

7. A well surveying device comprising a casing adapted to enter a bore hole, means for supporting therein a record member capable of being marked by a spark, an element having variable location relative to said record member depending upon inclination of the casing, and means for producing in making a single record at one position of the device in a bore hole a series of sparks from the element to mark the record member to record the position of the element relative to said member, said series of sparks serving to indicate whether the element is moving when the sparks occur.

8. A well surveying device comprising a casing adapted to enter a bore hole, means for supporting therein a record member capable of being marked by a spark, an element having variable location relative to said record member depending upon inclination of the casing, means for producing in making a single record at one position of the device in a bore hole a series of sparks from the element to mark the record member to record the position of the element relative to said member, and timing means for causing said series of sparks to jump during a predetermined short interval of time.

9. A well surveying device comprising a casing adapted to enter a bore hole, means for supporting therein a record disc capable of being marked by the passage of an electric current to the disc, a compass movable in said casing relative to said record disc in both azimuth and inclination, and means for producing an electric current under control of the compass to mark peripherally said record disc to record the azimuthal position of the compass relative to said disc irrespective of substantial inclination of the compass relative to said member.

10. A well surveying device comprising a casing adapted to enter a bore hole, means for supporting therein a record disc capable of being marked by a spark, a compass movable in said casing relative to the record disc in both azimuth and inclination, and means for producing an electric current under control of the compass to provide a spark to mark peripherally the record disc to record the azimuthal position of the compass relative to said disc irrespective of substantial inclination of the compass relative to said member.

11. A well surveying device comprising a casing adapted to enter a bore hole, means for clamping therein a record disc, means associated with the clamping means for marking the disc to show its position in the casing, an element having variable location relative to said disc depending upon inclination of the casing, and means for producing a spark from the element at the disc to mark the position of the element relative to said disc.

12. A well surveying device comprising a casing adapted to enter a bore hole, means for supporting therein a record member capable of being marked by an electric current, a pendulum having variable location relative to and adjacent said record member depending upon inclination of the casing, and means for producing an electric current through said pendulum to mark said member to record the position of the pendulum relative to said member, said pendulum having a link suspension in the casing through which suspension the marking current passes.

13. A well surveying device comprising a casing adapted to enter a bore hole, means for supporting therein a record disc capable of being marked by the passage of an electric current to the disc, a compass movable in azimuth in said casing relative to said record disc, and means for producing an electric current under control of the compass to mark peripherally said record disc to record the azimuthal position of the compass relative to said disc.

GEORGE A. SMITH.